Oct. 19, 1926.
I. ELLIOTT
1,603,333
OVEN
Filed March 15, 1924      2 Sheets-Sheet 1
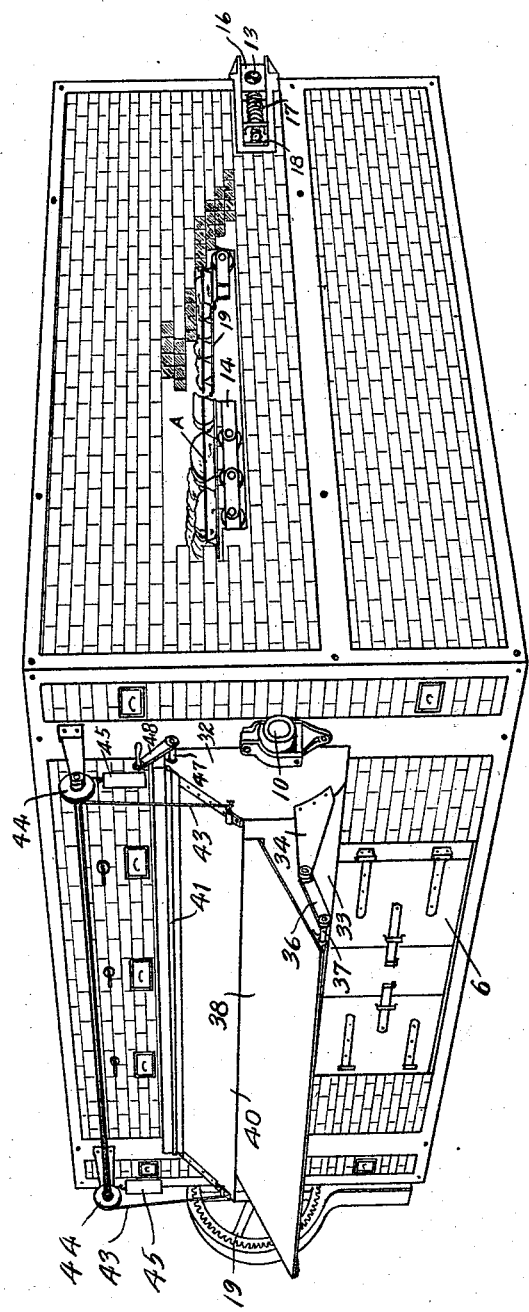
INVENTOR
IRWIN ELLIOTT
BY
Stockbridge & Borst
ATTORNEYS.

Oct. 19, 1926.
1,603,333
I. ELLIOTT
OVEN
Filed March 15, 1924    2 Sheets-Sheet 2
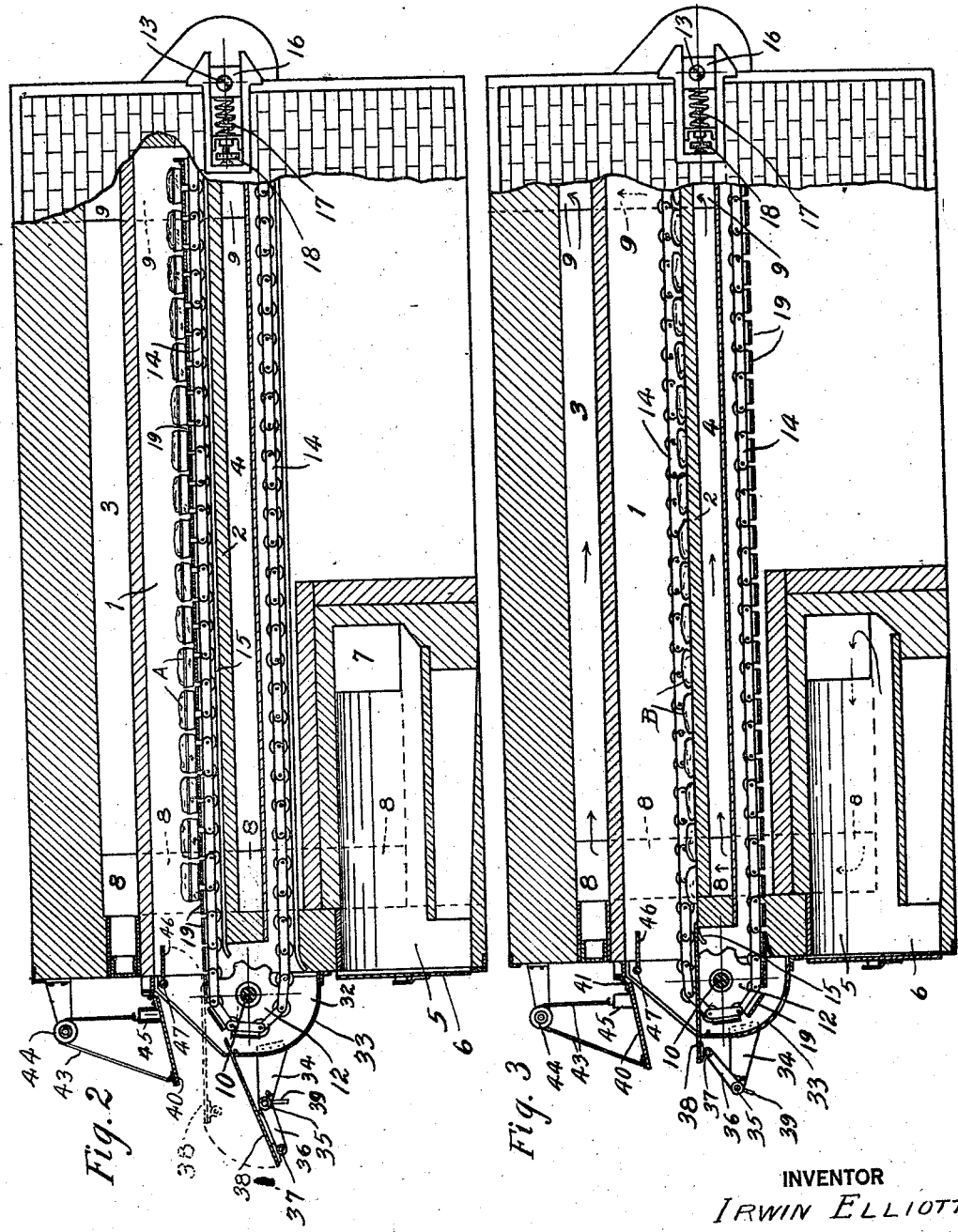
INVENTOR
IRWIN ELLIOTT
BY
Stockbridge & Borst
ATTORNEYS.

Patented Oct. 19, 1926.

1,603,333

UNITED STATES PATENT OFFICE.

IRWIN ELLIOTT, OF NEW YORK, N. Y., ASSIGNOR TO WILLIAMS OVEN MANUFACTURING COMPANY, A CORPORATION OF NEW YORK.

OVEN.

Application filed March 15, 1924. Serial No. 699,405.

This invention relates to baking ovens for the commercial baking of bread and other foodstuffs. There are two types of ovens commonly used in the commercial baking of foodstuffs, one known as the traveling oven which comprises a conveyor traveling through a heated chamber at the desired rate of speed to bake the material, and the other known as a peel oven which has a tile hearth on which the material to be baked is placed and allowed to remain in the oven until baked.

The traveling type of oven considerably reduces the cost of baking articles or foodstuffs by the saving in labor, but unfortunately all classes of foodstuffs cannot be properly baked in this type of oven since such ovens are really designed for goods, such as bread, baked in pans. Such ovens are not well adapted to the baking of such articles as Vienna and rye bread which are baked directly upon a hearth and not in pans. This limits the usefulness of the traveling oven to bakers having a large output and who can afford to operate a plurality of ovens, that is, a traveling type of oven for pan goods and a peel oven for the hearth goods. The type of traveling ovens heretofore generally used charge or feed at one end and deliver at the other, but in small bakeries such ovens frequently are not practical by reason of lack of floor space, which would make it imperative that the oven be fed and the goods removed from the same door or side.

An object of this invention is to provide an improved oven which embodies the principles and advantages of both the traveling type and peel type ovens, and which feeds and delivers from the same side or end. Various other objects and advantages will be apparent from the following description of an embodiment of the invention, and the novel features will be particularly pointed out hereinafter in claim.

In the accompanying drawing:

Fig. 1 is a perspective of an oven constructed in accordance with this invention;

Fig. 2 is a longitudinal sectional elevation through the same, with the oven adapted for the baking of pan goods;

Fig. 3 is a similar sectional elevation of the same with the oven adapted for use as a peel oven;

Fig. 4 is an elevation of the limit switch mechanism which may be used for controlling the operation of the endless carrier or conveyor; and Fig. 5 is a sectional elevation through certain details.

In the illustrated embodiment of the invention, the oven is provided with a baking chamber 1 having a hearth 2 with heating flues 3 and 4 passing above and below the baking chamber for supplying heat thereto. A fire box 5 is provided in the lower part of the oven at the forward end, access being had thereto, for supplying fuel, through a suitable door 6. The hot gases of combustion are conducted from the fire box through flues 7 and 8, the flue 8 opening into both of the flues 3 and 4 on the upper and lower sides of the baking chamber at a point adjacent the forward end of the baking chamber. The opposite ends of the flues 3 and 4 are connected to a flue 9 for removing the hot gases of combustion to a stack or other disposal device.

Since the flues 3 and 4 provide paths of equal length between the flues 8 and 9 the hot gases will be equally divided between these upper and lower flues 3 and 4, and consequently the baking chamber will be uniformly heated from above and below. Suitable valves or dampers may be provided in the openings between the flues 3 and 4 and the supply and removal flues 8 and 9, so that more or less of the hot gases may be passed through either of the flues 3 and 4. In this way the temperature of either the upper side or bottom of the baking chamber may be varied as desired. The dampers are not shown for the reason that they are common in ovens and are not specifically a part of this invention.

It will be noted that since the hot gases first strike the walls of the baking chamber at the forward end and leave at the rear end, the forward end of the baking chamber will be heated to a higher temperature than the rear end. This is of advantage for the reason that the articles last to be placed in the oven must be baked faster by means of a higher temperature if they are to be completely baked by the time that the articles first placed in the oven at the rear are completely baked. In this way burning or over-baking of the articles first placed in the oven will be avoided.

A shaft 10 is mounted in suitable bearing blocks 11 so as to extend across the forward end of the oven at a level near the floor of the baking chamber 1, and the shaft 10 carries a pair of sprocket wheels 12 at the opposite sides of the baking chamber. Similar sprocket wheels (not shown) are provided on a shaft 13 extending across the oven at the rear end, the corresponding sprockets on the shafts 10 and 11 being connected by an endless chain or similarly driven device 14, disposed one at each side of the baking chamber. The upper stretch of each chain passes between the corresponding forward and rearward sprocket wheels through the baking chamber and along the floor thereof, and the lower stretch passes below the flue 4 in a passage which is provided in the interior of the oven.

A track rail 15 is provided upon the floor of the baking chamber at each side beneath the chains, so as to take up the wear of the chains and form tracks therefor. The shaft 13 is mounted in bearing blocks 16 which are normally pressed by suitable spring devices 17 in a direction to tension the chains 14 and maintain them taut. An adjustable abutment 18 at each side provides means for variably compressing the springs.

Approximately one-half of each chain is connected by slats 19 to a corresponding part of the other chain, the slats forming a flexible floor or conveyor supported by and carried with the chain, so that when the sections of the chain which are connected by the slats are within the baking chamber, as shown in Figs. 1 and 2, the slats will form a floor or conveyor for the support of the pans A carrying foodstuffs to be baked. When the chains are operated to carry the slats forwardly out of the baking chamber 1, the other sections of the chains will enter the baking chamber, and since these sections of the chains are unconnected by the slats, the floor or hearth 2 of the baking chamber will be exposed between the chains which are at opposite sides of the chamber. These relative positions of the chains are shown in Fig. 3, and it will be noted that the sections of the chains connected by slats are disposed below the flue chamber 4. In this position of the conveyor, the floor or hearth 2 is exposed so that articles B such as Vienna and rye bread, may be placed thereon and baked as usual in peel ovens.

A gear 19 is mounted upon one end of the shaft 10 for driving the same, and is in turn connected to any suitable source of power such as an electric motor (not shown), so that when the motor is operated the chains at opposite sides of the baking chamber will be operated between the two relative positions shown in Figs. 2 and 3. The shaft 10 at the same end is also provided with a small pinion 20 (see Fig. 4) and this pinion meshes with a larger gear 21 carried by a stub shaft 22. The gear 21 carries an operating pin 23 which is adapted to engage, and rotate through a small angle, a lever 24, pivoted at 25, at approximately the completion of a complete revolution in each direction. A pair of contact or switch levers 26 and 27 are provided with rollers 28 and 29, respectively, which are adapted to be engaged by the lever 24 when the latter is rotated in opposite directions. Each lever 26 and 27 is adapted when free to complete respectively a circuit between contact terminals 30 which controls the operation of the motor in one direction, and contact terminals 31 which controls operation of the motor in the opposite direction.

The ratio between the gears 20 and 21 is such that the gear 21 will be given approximately a complete rotation while the chains are moving between the relative positions shown in Figs. 2 and 3, and accordingly, at the end of each rotation of the gear 21, one of the limit switches 26 or 27 will be operated to prevent further operation of the chains or conveyor in the same direction beyond the position shown in Figs. 2 and 3. At the same time the other limit switch which controls travel of the conveyor in the opposite direction will not be interfered with. It is, therefore, merely necessary to start the motor running in either direction and the limit switches will stop the conveyor at the completion of the desired travel of the conveyor between the relative positions shown in Figs. 2 and 3.

Bracket devices 32 are provided at opposite sides of the door of the chamber 1, and support a shield 33 extending from the front wall of the oven upwardly and forwardly around the sprocket wheels and conveyor to a point approximately on a level with the floor of the baking chamber.

An arm 34 is connected to each bracket member so as to extend forwardly therefrom, and each arm at its free end has connected thereto, by a pivot 35, a second arm 36 which is in turn connected at its other end by a pivot rod 37 to the corresponding end of the arm at the other side of the oven. A shelf member 38 extends across the front of the oven and is pivoted upon the rod 37. One of the pivots 35 may comprise a clamping screw controlled by an operating arm or button 39, so that when the arms 36 are swung about the pivots 35 they may be clamped in various angular positions by a tightening of the button 39.

When the oven is to be utilized for the baking of pan goods, as shown in Figs. 1 and 2, the arms 36 will be clamped in the positions shown in Figs. 1 and 2, so that the shelf 38 will rest upon the upper edge of the shield 33 and be supported by the arms 36 in an inclined position with an edge in close proximity to the conveyor. When the shelf is in this position it will receive the pans or articles from the conveyor as the articles fall from the conveyor when moving out of the door of the baking chamber. When the conveyor is in the position shown in Fig. 3, the arms 36 may be adjusted to the position shown in Fig. 3, so as to place the shelf 38 in the position shown in this figure where it forms a substantial forward continuation of the floor or hearth 2 of the baking chamber. This shelf then facilitates the insertion and removal of the articles being baked.

A shield 40 is hinged as at 41 to the oven at a point above the baking chamber so as to swing downwardly into proximity to the upper edge of the shield 33 and thus substantially close the baking chamber. Cables 43 are connected to the lower ends of the shield 40 at opposite sides, and pass upwardly over pulleys 44 and then downwardly, carrying counter-weights 45 at the lower ends. The counter-weights 45 are of such a size that the shield 40 will be substantially balanced so as to remain in any angular position to which it is adjusted.

A heat or baffle wall 46 is mounted upon a shaft 47 which is rotatably supported in the brackets 32 and extends across the open end or door of the baking oven. The shaft 47, at one end, carries an operating handle 48 (see Fig. 1). In Figs. 2 and 3, the baffle wall is shown in its upper position enabling access to be had to the baking chamber for an inspection of the baking operation or the insertion or removal of articles being baked. The baffle wall may be swung downwardly so as to substantially close the door opening of the baking chamber. A set screw 49 (see Fig. 5) is provided in one of the brackets 32 so as to force a friction peg 51 against the shaft 47 for the purpose of creating friction thereon sufficient to hold the shaft in different adjusted positions.

In the operation of the oven, the baking of pan goods will be first explained. Assuming the conveyor to be in the position shown in Fig. 3, the shelf 38 will be positioned as shown in Fig. 2. The motor is then operated to run the conveyor in a direction to cause its upper stretch to move toward the rear of the baking chamber, and during this travel the slats will successively appear at the door of the baking chamber and travel toward the rear of the chamber. The pans A containing the articles to be baked, or the articles themselves, are placed upon the slats and carried by the conveyor into the baking chamber. When the slat connected section of the conveyor has moved entirely into the baking chamber, as shown in Fig. 2, the pin 23 will engage and operate the lever 24 to open the limit switch 27, thus preventing further operation of the motor in the same direction. The baffle wall 46 is then closed and the articles are allowed to bake the desired length of time.

When the articles have remained in the oven for the desired length of time and the baking thereof is completed, the motor is operated in the reverse direction to move the slats forwardly in the baking chamber. As the slats move around the sprocket wheel the pans carried thereby will slide off upon the shelf 38 from which they may be removed by the attendants. When all of the slats have moved out of the baking chamber and into the position shown in Fig. 3, the pin 23 will have engaged with the other side of the lever 24 and operated it in a reverse direction to lift the arm 26, as shown in Fig. 4, and thus open the circuit of the motor controlling further rotation in the same direction. This automatically stops the conveyor in this position. The conveyor may then be operated in a reverse direction to carry the slats again into the baking oven for a new baking operation, as before explained.

For the baking of hearth products the shelf 38 is placed in the position shown in dotted lines in Fig. 2 and full lines in Fig. 3, so as to form a forward continuation of the baking hearth, it being assumed that the conveyor is in the position shown in Fig. 3. The articles to be baked directly upon the hearth are then placed in the oven upon the hearth by peeling and may be removed in the manner commonly adopted in connection with peel ovens.

It will be observed that with this improved oven the conveyor may be utilized for pan baking so as to have all the advantages of a continuous or conveyor type of oven, and the feeding and delivery occurs from the same or forward end. Also the device may be set so as to expose the hearth for use in peel or direct hearth baking. Consequently one oven of this type will enable one to bake all kinds of foodstuffs in the desired manner.

It will be understood that various changes in the details and arrangement of parts, herein described and illustrated for the purpose of explaining the nature of the invention, may be made by those skilled in the art within the principle and scope of the invention, as expressed in the appended claim.

I claim:

In a baker's oven, a baking chamber having a charging door and a baking hearth, a conveyor having two sections which are movable alternately into and out of the baking chamber during the travel, one of the sections having means for supporting and conveying articles into and out of the baking chamber as it is moved into and out of said chamber, the other section being open to expose the hearth for direct hearth baking when it is within the chamber, and a charging and delivery plate mounted for movement into a position to form a substantial continuation of the hearth when the latter is exposed by the conveyor for hearth baking, and into a position to receive the baked articles from the conveyor when the conveyor is moving in a direction to carry the baked articles thereon out of the oven.

In witness whereof, I hereunto subscribe my signature.

IRWIN ELLIOTT.